(12) United States Patent
Worsley et al.

(10) Patent No.: US 9,278,465 B1
(45) Date of Patent: Mar. 8, 2016

(54) SYSTEM AND METHOD FOR 3D PRINTING OF AEROGELS

(71) Applicant: Lawrence Livermore National Security, LLC, Livermore, CA (US)

(72) Inventors: Marcus A. Worsley, Hayward, CA (US); Eric Duoss, Dublin, CA (US); Joshua Kuntz, Livermore, CA (US); Christopher Spadaccini, Livermore, CA (US); Cheng Zhu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 3 days.

(21) Appl. No.: 14/481,362

(22) Filed: Sep. 9, 2014

(51) Int. Cl.
| | |
|---|---|
| *C23F 1/02* | (2006.01) |
| *B29C 41/00* | (2006.01) |
| *C01B 31/04* | (2006.01) |
| *B29L 9/00* | (2006.01) |
| *B33Y 10/00* | (2015.01) |
| *B33Y 30/00* | (2015.01) |
| *B33Y 70/00* | (2015.01) |

(52) U.S. Cl.
CPC .............. *B29C 41/003* (2013.01); *C01B 31/043* (2013.01); *B29L 2009/00* (2013.01); *B33Y 10/00* (2014.12); *B33Y 30/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 9,077,041 B2 * | 7/2015 | Burnside | H01M 4/805 |
| 2014/0178759 A1 * | 6/2014 | Worsley | H01M 4/131 |
| | | | 429/220 |
| 2015/0114907 A1 * | 4/2015 | Gong | C08B 15/02 |
| | | | 210/660 |

OTHER PUBLICATIONS

Biener, Juergen et al. "Macroscopic 3D Nanographene with Dynamically Tunable Bulk Properties," Adv. Mater., 2012, DOI: 10.1002/adma.201202289, 5 pages.
Worsley, Marcus A. et al. "Synthesis of Graphene Aerogel with High Electrical Conductivity," J. Am. Chem. Soc., 2010, 3 pages.
Worsley, Marcus A. et al. "High Surface Area, sp2-Cross-Linked Three-Dimensional Graphene Monoliths," J. Phys. Chem. Lett., 2011, pp. 921-925.
Shin, Swanee J. et al. "Mechanical Deformation of Carbon-Nanotube-Based Aerogels," Carbon 50 (2012), DOI: 10.1016/j.carbon.2012.06.044, 3 pages.
Worsley, Marcus A. et al. "Mechanically Robust 3D Graphene Macroassembly with High Surface Area," Chem. Commun., 2012, No. 48, 8428-8430, 3 pages.

* cited by examiner

*Primary Examiner* — Shamim Ahmed
(74) *Attorney, Agent, or Firm* — Harness, Dickey & Pierce

(57) ABSTRACT

A method of forming an aerogel. The method may involve providing a graphene oxide powder and mixing the graphene oxide powder with a solution to form an ink. A 3D printing technique may be used to write the ink into a catalytic solution that is contained in a fluid containment member to form a wet part. The wet part may then be cured in a sealed container for a predetermined period of time at a predetermined temperature. The cured wet part may then be dried to form a finished aerogel part.

19 Claims, 3 Drawing Sheets

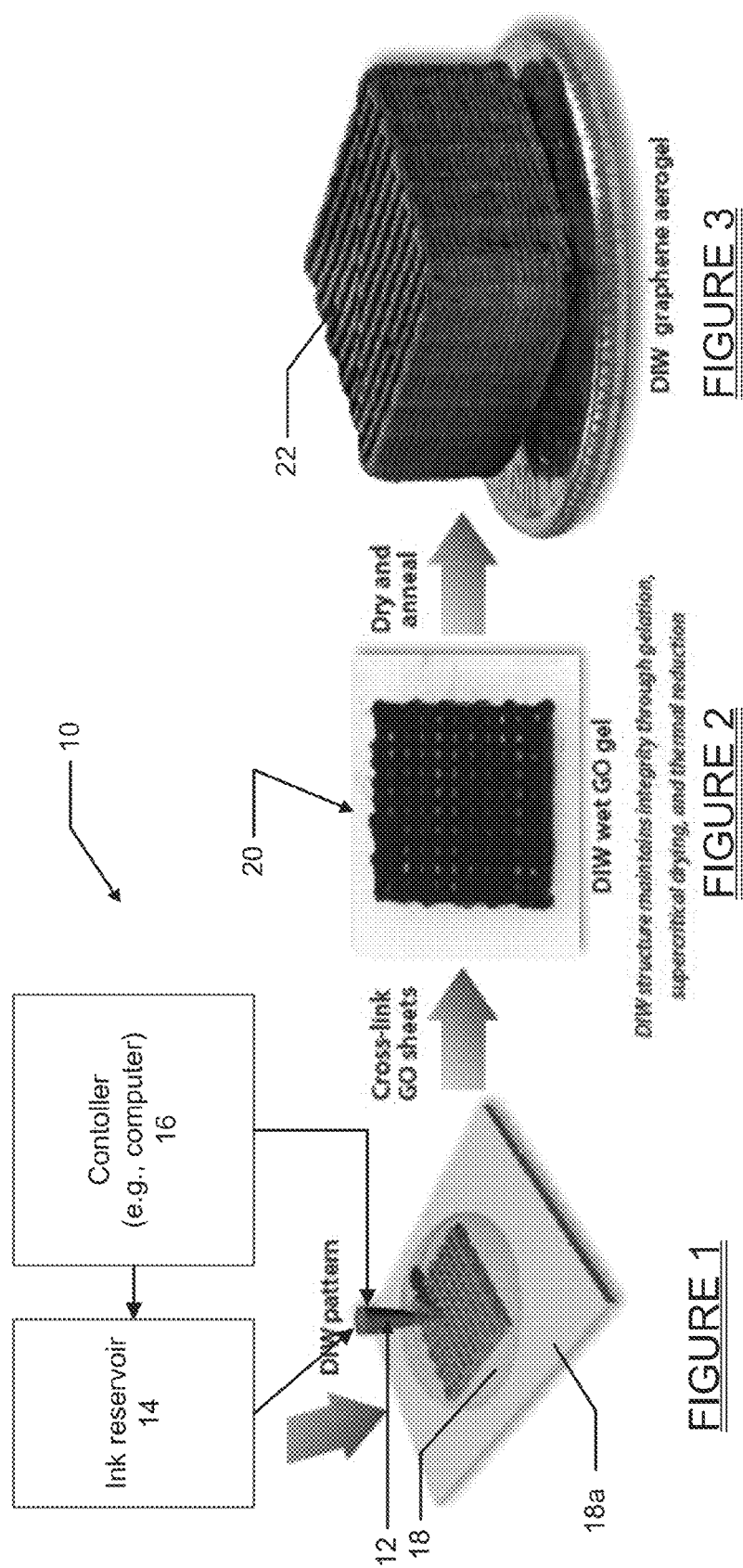

SYSTEM AND METHOD FOR 3D PRINTING OF AEROGELS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to aerogels and the manufacture of aerogels, and more particularly to an aerogel made using a 3D printing technique.

BACKGROUND

The statements in this section merely provide background information related to the present disclosure and may not constitute prior art.

Materials with hierarchical porosity find applications in a wide range of technologies. Such applications may involve catalysis, desalination, energy storage and conversion, thermal and acoustic insulation applications, and filtration applications as sorbents for water purification, just to name a few. Aerogels, foams and ordered arrays of hollow spheres are desirable for such applications, with aerogels being especially desirable. Aerogels are microporous and mesoporous (pores <300 nm), ultra-lightweight materials that can achieve surface areas in excess of 3000 m$^2$/g. Because of these characteristics, they are ideally suited for the above listed technologies and applications.

Aerogels are made via the sol-gel process in which a reaction solution is gelled and the solvent is extracted. The solvent is extracted in such a way as to leave the porous, solid matrix intact. Though the pore sizes of aerogels can typically be tuned somewhat by varying the synthetic parameters of the sol-gel process, limitations do exist. The hierarchical nature of the porosity (e.g. pores on several size scales) allows these materials to simultaneously achieve high surface areas (pores <2 nm), and fast mass transport (pores >1 micron) leading to improved performance in relevant applications, such as catalysis. The techniques used to achieve these materials are typically limited in either the range of pore sizes that can be achieved and/or the time/cost of the process. Accordingly, there is still a strong interest in a method that can be carried out rapidly, and which is able to precisely tailor materials to have a hierarchy of pore sizes. In particular, there is a particularly strong interest in tailoring a system and method that can be used to produce an aerogel having pores ranging from less than about 2 nm in diameter to greater than about 100 microns in diameter. There is also a strong interest in a new system and method which enables an aerogel to be formed which has an improved hierarchy of pore sizes, a greater range of pore sizes, and the ability to form the aerogel such that pores of selected sizes can be placed (i.e., formed) at specific locations of the aerogel.

SUMMARY

In one aspect the present disclosure relates to a method of forming an aerogel. The method may involve providing a graphene oxide powder and mixing the graphene oxide powder with a solution to form an ink. A 3D printing technique may be used to write the ink into a catalyst that is contained in a fluid containment member. The ink may be used to form a wet part. The wet part may then be cured in a sealed container for a predetermined period of time at a predetermined temperature, to form a cured, wet part. The cured wet part may then be dried to form a finished aerogel part.

In another aspect the present disclosure relates to a method of forming an aerogel. The method may include providing a graphene oxide powder and mixing the graphene oxide powder with an aqueous solution. A sonication operation may be performed on the mixture of the graphene oxide powder and the aqueous solution to form an ink. A 3D printing technique may be used to write the ink into a catalytic solution that is contained in a fluid containment member. The 3D printing may be performed to apply the ink to form a plurality of ink layers, one on top of another, to form a wet three dimensional part having a desired shape and desired dimensions. The wet three dimensional part may be cured in a sealed container for a predetermined period of time at a predetermined temperature to form a cured, wet three dimensional part. The cured, wet three dimensional part may then be supercritically dried to form a finished aerogel part.

In still another aspect the present disclosure relates to a system for forming an aerogel. The system may include a controller and a deposition component controlled by the controller for depositing an ink in a catalyst. The ink may include a graphene oxide powder in a solution. The controller may be further configured to implement a 3D printing technique to write the ink into a catalytic solution, wherein the catalytic solution is contained in a fluid containment member. The 3D printing technique may be used by the controller to form a plurality of ink layers one on top of another to form a wet three dimensional part. A sealed container may be included for curing the wet three dimensional part for a predetermined period of time at a predetermined temperature, to form a cured, wet three dimensional part. A subsystem may be included for drying the cured, wet three dimensional part to form a finished aerogel part.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a high level perspective view illustrating a 3D printing process where graphene oxide (GO) cross-linked sheets are created as a plurality of layers using the 3D printing process to begin the formation of a three dimensional wet part;

FIG. 2 is a high level perspective illustration of a three dimensional wet GO gel structure created using the 3D printing process;

FIG. 3 is a perspective view of the 3D printed graphene aerogel part that results after supercritical drying and annealing;

DETAILED DESCRIPTION

Figure 4:
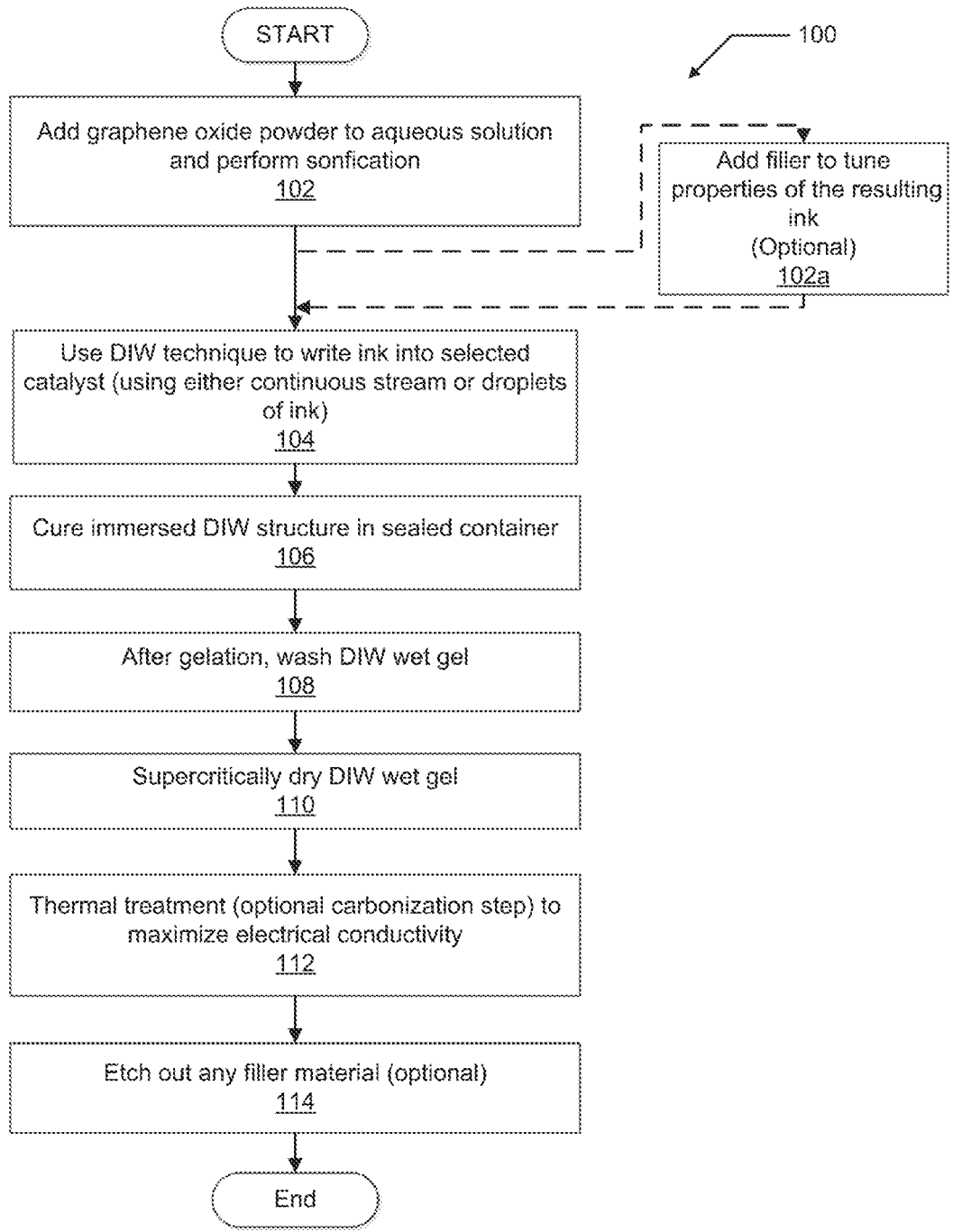
FIG. 4 is a flowchart illustrating one example of operations that may be used to form an aerogel part in accordance with the present disclosure.

The following description is merely exemplary in nature and is not intended to limit the present disclosure, its application or uses. It should be understood that throughout the drawings, corresponding reference numerals indicate like or corresponding parts and features.

For applications that require faster mass transport through the aerogel, alternative methods for incorporating larger pore networks into the aerogel structure are desired. The present disclosure addresses this need through a system and method of making an aerogel that incorporates the technique (i.e., process) of 3D printing of sol-gel materials, which upon drying become 3D printed aerogels. Characterization of the 3D printed aerogels will be discussed in comparison to their bulk counterparts. The presently disclosed method also forms a fast method for precisely tailoring a hierarchy of materials with pores that can range from less than 2 nm to greater than about 100 microns.

In a typical synthesis, an ink is initially formed using an aqueous suspension of about 1-60 mg/cc of graphene oxide (GO), and more preferably about 40 mg/cc graphene oxide. The aqueous suspension may be prepared by sonication to form an ink. Alternatively, an organic solution/solvent could be used. A filler, for example fumed silica, carbon black, graphene nanoplatelets, etc., can be added to further tune the properties of the ink.

FIG. 1 illustrates a high level depiction of a system 10 that implements a 3D printing technique which is used to write the ink into a bath of a suitable catalytic solution. The ink is supplied via a reservoir 14 to a suitable application nozzle 10. The movement of the nozzle 12 within three axes (X, Y and Z) may be controlled by a controller 16 (e.g., computer). The application of ink from the reservoir 14 may also be controlled by the controller 16. The controller 16 may be part of a computer-aided design (CAD) and/or computer aided manufacturing (CAM) system.

The catalytic solution that the ink is deposited in may be a bath of ammonia saturated iso-octane 18 held within a suitable fluid containment member, for example a petry dish 18a. One layer at a time may be formed by depositing the ink in the desired pattern to form a wet three dimensional structure. The ink may be deposited in any desired pattern. In the example shown in FIG. 2, each layer forms a cross-linked sheet. By "cross-linked" it is meant that bonding between the graphene oxide layers occurs. It will be appreciated that this happens on a microscopic level, and represents how the solution transitions from a liquid to a gel. Any desired pattern can be used when laying down each layer of ink to meet the needs of a specific application, providing of course that the layers are somehow inter-linked in a suitable manner such that upon drying, the resulting structure will form a single, integrated structure. In one example the ink is deposited as a continuous stream or bead using the nozzle 12. In some applications, however, it may be more advantageous to deposit the ink as distinct droplets. The present disclosure contemplates applying the ink in both fashions. In some instances, depositing the ink as droplets via a digital control system controlling the output of the nozzle 12 may enable more controlled deposition of the ink and/or even more complex deposition patterns to be realized. And of course, a plurality of nozzles could be employed to deposit a plurality of different types of ink, either as streams of ink or as droplets of ink, to meet or optimize the manufacturing of a specific part. Using a plurality of different types of ink during the 3D printing operation to make different portions of a single part can enable even further tailoring of specific portions of the part to impart desired and/or different characteristics to various portions of the part. A 3D printed, wet, graphene oxide gel, fully formed three dimensional part (i.e., structure) 20, ready for drying, is shown in FIG. 2.

FIG. 3 illustrates a finished 3D printed graphene oxide, three dimensional aerogel part 22.

FIG. 4 is a flowchart 100 of one example that sets forth additional details on how the finished three dimensional part 22 of FIG. 3 may be formed. At operation 102 graphene oxide powder may be mixed with an aqueous solution and then sonicated for preferably about 0.5-48 hours, and more preferably about 24 hours, to form a graphene oxide (GO) ink. In one example the mixture of graphene oxide powder and the aqueous solution comprises about 40 mg/cc of graphene oxide, although this may vary to suit specific applications. The sonication serves to dispense the GO layers/sheets. Put differently, sonication helps to achieve a uniform dispersion of GO layers/sheets and to minimize/eliminate the occurrence of clogging of the nozzle 12 during the 3D printing process. Optimizing dispersion of GO layers/sheets also maximizes the surface area in the 3D printed aerogel. Optionally, at operation 102a, a filler material, for example and without limitation, silica nanoparticles, may be added to tune the properties of the resulting ink. By "tune" it is meant tailor properties such as, without limitation, viscosity and yield stress. Other filler materials could comprise fumed silica, carbon black or graphene nanoplatelets, just to name a few.

At operation 104 a 3D printing technique is used to write the ink into a bath of a suitable catalytic solution. In one example the catalytic solution may be ammonia saturated iso-octane. Other catalytic solutions could be, for example, sodium carbonate, ascorbic acid, sodium hydroxide, etc. Alternatively, the catalytic solution can be added directly to the ink before the 3D printing takes place. The ink may be deposited as a stream or as a pulsed series of droplets in a desired pattern. The first layer is deposited on the surface of the petry dish 18a while the petry dish is filled with the selected catalytic solution. Additional layers are successively printed on top of one another to build up the wet three dimensional part 20 shown in FIG. 2. It is important that the ink be written into a liquid solution so that the ink does not dry out during the 3D printing process. The liquid also needs to be immiscible with water; iso-octane is one such liquid.

With continuing reference 4, at operation 106 the immersed 3D printed, wet three dimensional part 20 is then cured at a suitable temperature in a hermetically sealed container for preferably about 8-72 hours. A suitable temperature range is about 70-100 degrees Celsius, and more preferably about 85 degrees Celsius. The curing achieves gelation of the wet three dimensional part 20. At operation 108 the 3D printed wet three dimensional part 20, which is still a wet gel, may be washed.

At operation 110 the 3D printed wet three dimensional part 20 may be supercritically heated to dry it to form the finished three dimensional aerogel part 22 shown in FIG. 3. Alternatively, freeze drying or ambient drying could be performed instead of using supercritical heating. Optionally, an annealing operation may also be performed on the dried part. Optionally, an etching operation may also be performed on the dried part to remove filler.

Operation 112 is an optional thermal operation that may be performed to carbonize the finished three dimensional aerogel part 22. Carbonization enhances the electrical conductivity of the finished three dimensional aerogel part 22. Operation 114 is also optional if a filler has been used in the ink. Operation 114 may involve using a suitable substance, for example sodium hydroxide, to etch out the filler from the finished 3D printed aerogel part 22.

Figure 5:
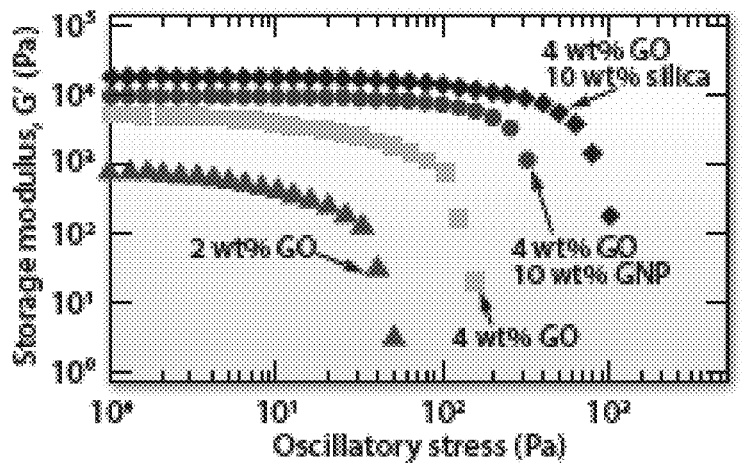
FIG. 5 is a graph illustrating a plot of storage modulus versus oscillatory stress for several 3D printing inks.

FIG. 5 illustrates a plot of storage modulus versus oscillatory stress for several 3D printing inks.

Figure 6:
FIGS. 6 and 7 illustrate differences in the morphology of 3D printed aerogel parts (FIG. 6), and 3D printed graphene nanoplatelet filled aerogels (FIG. 7) made with a method of the present disclosure.
Figure 7:

FIGS. 6 and 7 illustrate the differences in morphology of 3D printed aerogels made in accordance with the method described herein, but without a filler material (FIG. 6), and 3D printed aerogels made in accordance with the method described herein but using graphene nanoplatelets as a filler material. The aerogel without filler essentially looks like a standard bulk aerogel. However, with the filler material, the aerogel structure is significantly altered with less meso and macropores than the standard bulk aerogel.

The system and method of the present disclosure can be used to form not only graphene oxide aerogels, but also, without limitation, graphene/carbon nanotube aerogels, organic aerogels and carbon aerogels. Still further, the system and method of the present disclosure may be used to form aerogels from, but not limited to, metal oxides, metal sulfides, metals, ceramics, carbides, nitrides, sulfides, borides, chalcogenides, etc.

The system and method of the present disclosure thus provides a method which can be used to rapidly produce a graphene oxide aerogel having a hierarchy of pore sizes. The 3D printed graphene oxide aerogel produced by the system and method of the present disclosure simultaneously achieves high surface areas (pores greater than 2 nm) and fast mass transport (pores greater than 1 micron) in a structure that still maintains excellent mechanical elasticity. The 3D printed graphene oxide aerogel structures produced using the method of the present disclosure are ideally suited for a wide range of applications involving energy storage, electronics, composites, actuators, and sensors, just to name potential fields of application.

Importantly, the system and method of the present disclosure enables both an improved hierarchy of pore sizes and a greater range of pore sizes. The "improved" hierarchy is the ability to deterministically place large pores where the designer wants them in the finished aerogel part. This may be achieved because with the present system and method, the designer can essentially put the ink where it is desired and write virtually any pattern that is desired. Porosity can be controlled by controlling the space that separates each line of ink that is written. This spacing can be controlled from the 100's of nanometers to over 100's of microns. And the shape of the spacing or void created just depends on the particular pattern that the designer wishes to write. Thus, the system and method of the present disclosure enables "designed porosity" of the finished aerogel part, not random porosity throughout the part. Furthermore, the typical range of pores in aerogels range from about 1 nm to 10's of microns, but with the present system and method, aerogels can be produced which have pores which can range from 1 nm to 100's of microns. And again, the 0.1-100's of microns range can be designed, not random.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of forming an aerogel including:
providing a graphene oxide powder;
mixing the graphene oxide powder with a solution to form an ink;
using a 3D printing technique to write the ink into a catalytic solution that is contained in a fluid containment member to form a wet part;
curing the wet part in a sealed container for a predetermined period of time at a predetermined temperature, to form a cured wet part; and
drying the cured wet part to form a finished aerogel part.

2. The method of claim 1, wherein the 3D printing technique is performed repeatedly to form a plurality of ink layers, one on top of another.

3. The method of claim 1, wherein the 3D printing technique is performed using a continuous stream of the ink to deposit the ink in a desired pattern in the catalytic solution.

4. The method of claim 1, wherein the 3D printing technique is performed using droplets of the ink to deposit the ink in a desired pattern in the catalytic solution.

5. The method of claim 1, further comprising washing the cured wet part prior to drying the cured wet part.

6. The method of claim 1, further comprising adding a filler material into the ink prior to performing the 3D printing technique.

7. The method of claim 6, wherein adding the filler material comprises adding at least one of the following materials:
fumed silica;
carbon black; and
graphene nanoplatelets.

8. The method of claim 6, further comprising removing the filler material from the finished aerogel part.

9. The method of claim 8, wherein the filler material is etched using sodium hydroxide to remove the filler material from the finished aerogel part.

10. The method of claim 1, further comprising applying a thermal treatment to the finished aerogel part to enhance electrical conductivity of the finished aerogel part.

11. The method of claim 1, wherein the finished aerogel part forms a multi-layer, three dimensional structure.

12. The method of claim 1, wherein the finished aerogel part forms a three dimensional structure having a hierarchy of pore sizes ranging from less than 2 nm to greater than 100 microns.

13. A method of forming an aerogel including:
providing a graphene oxide powder;
mixing the graphene oxide powder with an aqueous solution;
performing a sonication operation on the mixture of the graphene oxide powder and the aqueous solution to form an ink;
using a 3D printing technique to write the ink into a catalytic solution, wherein the catalytic solution is contained in a fluid containment member;
performing the 3D printing technique to apply the ink to form a plurality of ink layers, one on top of another, to form a wet three dimensional part having a desired shape and desired dimensions;
curing the wet three dimensional part in a sealed container for a predetermined period of time at a predetermined temperature to produce a cured wet three dimensional part; and
supercritically drying the cured wet three dimensional part to form a finished aerogel part.

14. The method of claim 13, wherein the curing is performed in a sealed container at a predetermined temperature for a predetermined time period.

15. The method of claim 14, wherein the curing is performed at a temperature of about 85 degree Celsius.

16. The method of claim 13, further comprising, after curing the wet three dimensional part, washing the cured, wet three dimensional part prior to supercritically drying the cured, wet three dimensional part.

17. The method of claim 13, further comprising performing a thermal operation on the finished aerogel part to enhance its electrical conductivity.

18. The method of claim 13, further comprising:
  applying a filler material to the ink before the ink is used in the 3D printing; and
  after the supercritical drying, removing the filler material from the finished aerogel part.

19. The method of claim 13, wherein using the 3D printing technique to write the ink into a catalytic solution comprises using the 3D printing technique to write the ink into ammonia saturated iso-octane.

* * * * *